United States Patent
Papon et al.

(10) Patent No.: US 11,854,224 B2
(45) Date of Patent: Dec. 26, 2023

(54) THREE-DIMENSIONAL SKELETON MAPPING

(71) Applicant: Disney Enterprises, Inc., Burbank, CA (US)

(72) Inventors: Jeremie A. Papon, Los Angeles, CA (US); Andrew James Kilkenny, Pasadena, CA (US); David R. Rose, Glendale, CA (US)

(73) Assignee: Disney Enterprises, Inc., Burbank, CA (US)

( * ) Notice: Subject to any disclaimer, the term of this patent is extended or adjusted under 35 U.S.C. 154(b) by 264 days.

(21) Appl. No.: 17/383,895

(22) Filed: Jul. 23, 2021

(65) Prior Publication Data
US 2023/0028562 A1    Jan. 26, 2023

(51) Int. Cl.
*G06T 7/73* (2017.01)
*G06T 7/00* (2017.01)

(52) U.S. Cl.
CPC .......... *G06T 7/73* (2017.01); *G06T 7/97* (2017.01); *G06T 2207/20081* (2013.01); *G06T 2207/30196* (2013.01)

(58) Field of Classification Search
CPC ... G06T 7/73; G06T 7/97; G06T 2207/20081; G06T 2207/30196; G06T 2207/20084; G06T 2207/20088; G06T 7/75
USPC ....................................................... 382/154
See application file for complete search history.

(56) References Cited

U.S. PATENT DOCUMENTS

| | | |
|---|---|---|
| 8,599,252 B2 | 12/2013 | Komoto et al. |
| 8,896,665 B2 | 11/2014 | Kim et al. |
| 2014/0043329 A1 | 2/2014 | Wang et al. |
| 2019/0130602 A1 | 5/2019 | Hall |
| 2019/0139297 A1* | 5/2019 | Chen ................. G06T 19/20 |

OTHER PUBLICATIONS

International Search Report and Written opinion dated Aug. 1, 2022 for International Application PCT/US2022/026572.
Laura Julià, Pascal Monasse "Critical Review of the Trifocal Tensor Estimation" The Eighth Pacific-Rim Symposium on Image and Video Technology, Nov. 2017, Wuhan, China pp. 1-14.
Long Chen, Haizhou Ai, Rui Chen, Zijie Zhuang, Shuang Liu "Cross-View Tracking for Multi-Human 3D Pose Estimation at over 100 FPS" Apr. 28, 2021 pp. 1-12.

(Continued)

*Primary Examiner* — Stephen P Coleman
(74) *Attorney, Agent, or Firm* — Farjami & Farjami LLP

(57) ABSTRACT

A system includes processing hardware and a memory storing software code. When executed, the software code receives first skeleton data including a first location of each of multiple skeletal key-points from the perspective of a first camera, receives second skeleton data including a second location of each of the skeletal key-points from the perspective of a second camera, correlates first and second locations of some or all of the multiple skeletal key-points to produce correlated skeletal key-point location data for each of at least some skeletal key-points. The software code further merges the correlated skeletal key-point location data for each of those at least some skeletal key-points to provide merged location data, and generates, using the merged location data and the locations of the first, second, and third cameras, a mapping of the 3D pose of a skeleton.

20 Claims, 3 Drawing Sheets

(56) References Cited

OTHER PUBLICATIONS

Junting Dong, Wen Jiang. Qixing Huang, Hujun Bao, Xiaowei Zhou "Fast and Robust Multi-Person 3D Pose Estimation from Multiple Views" Jan. 14, 2019 pp. 1-10.
Olof Enqvist "Robust Algorithms for Multiple View Geometry-Outliers and Optimality" Lund University 2011 pp. 1-133.
Muhammed Kocabas, Salih Karagoz, Emre Akbas "Self-Supervised Learning of 3D Human Pose using Multi-view Geometry" Computer Vision Foundation pp. 177-186.

* cited by examiner

THREE-DIMENSIONAL SKELETON MAPPING

BACKGROUND

Pose and gesture detection systems tend to perform poorly when multiple bodies are in close proximity with one another, or are in physical contact. For example, entertainment venues at which the bodies of spectators occlude one another, and environments where adults may be carrying children pose substantial challenges to conventional pose and gesture detection techniques. Nevertheless, there are many use cases in which accurately distinguishing amongst individual bodies in a crowded environment may have significant health, safety, and logistical applications. Consequently, there is a need in the art for a mapping solution capable of reliably distinguishing the location, pose, posture, and gestures of one body from another.

DETAILED DESCRIPTION

Figure 1:
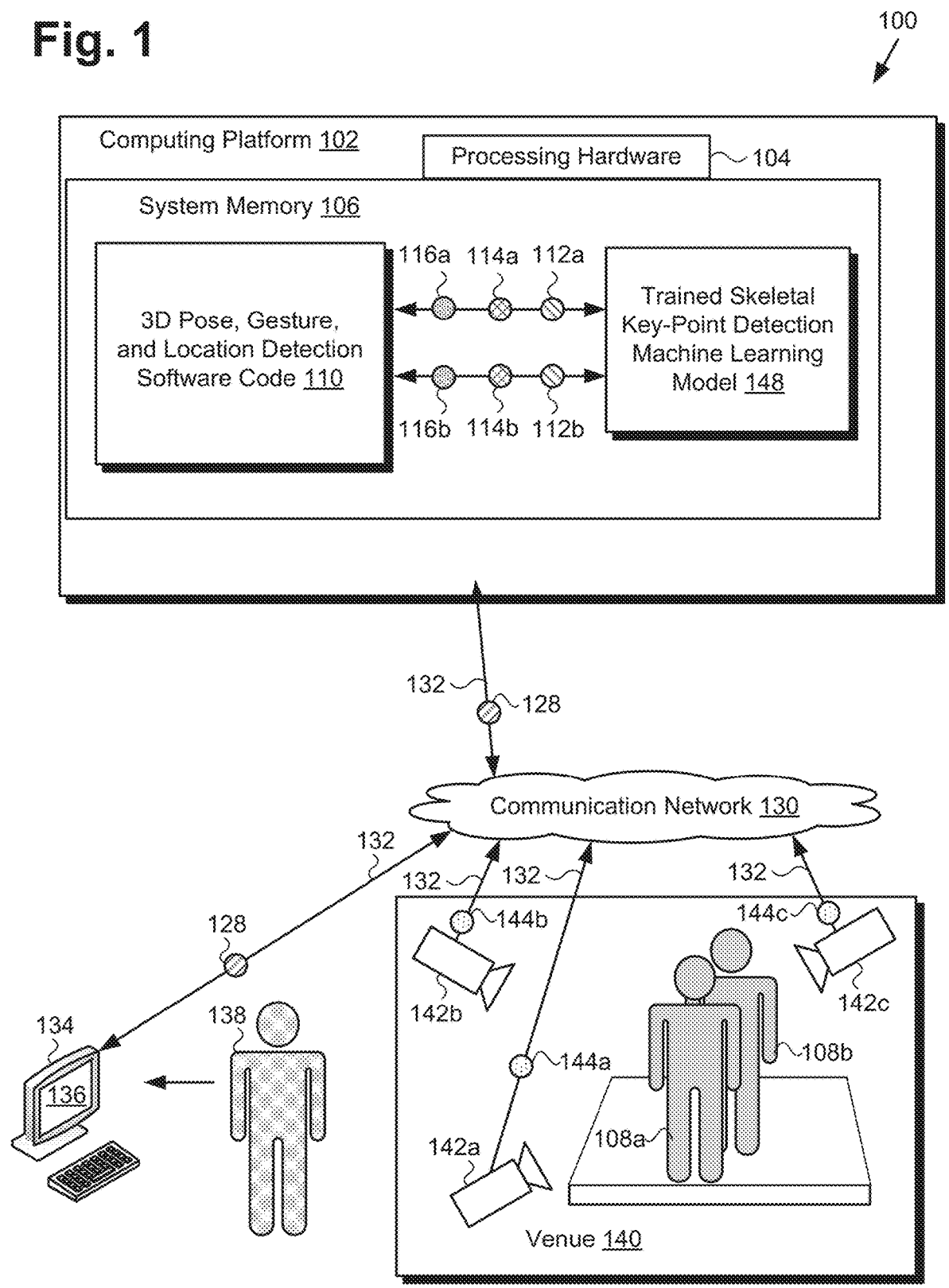
FIG. 1 shows a diagram of an exemplary system for performing three-dimensional (3D) skeleton mapping, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application is directed to systems and methods for performing three-dimensional (3D) skeleton mapping that address and overcome the deficiencies in the conventional art. Conventional solutions typically rely on visual features such as body types, ethnicity, clothing, and the like. These conventional approaches suffer from uncertainty because different people often look similar, especially at a distance. Moreover, visual features are perspective dependent, making matching between different perspectives that are distant from one another very difficult. Visual features are also often expensive to compute and typically scale poorly when multiple people are present.

By contrast to the conventional approaches described above, and as discussed in greater detail below, the present novel and inventive concepts advantageously rely only on geometric constraints, and so do not require expensive neural processing to compute visual features. Thus, the present 3D skeleton mapping solution may be implemented without the detection or determination of any personally identifiable information (PII) of a person. In addition, in one implementation, the present solution can be formulated as a series of matrix multiplications, thereby enabling substantially all mapping combinations to be tested in a single pass using graphics processing unit (GPU) hardware, for example. Furthermore, the present 3D skeleton mapping solution can advantageously be implemented as substantially automated systems and methods.

It is noted that, in the interests of conceptual clarity, the novel and inventive concepts disclosed in the present application are described by reference to 3D mapping of human skeletons. However, it is emphasized that this particular use case is not to be interpreted as limiting. In other implementations, the structures being mapped may correspond to non-human living beings, machines, other inanimate objects, or any combination of human beings, non-human living beings, machines, and other inanimate objects.

By way of example, in some implementations, the present techniques may be employed to track pedestrian traffic flow, or to determine typical wait times and crowding at transportation hubs such as airport gates and other public transportation portals. Alternatively, or in addition, the present 3D skeleton mapping solution may be used in a retail environment to determine the effectiveness of a product display, as well as in a healthcare or assisted living setting to detect whether a person has fallen or is otherwise experiencing physical distress.

It is further noted that, as used in the present application, the terms "automation," "automated," and "automating" refer to systems and processes that do not require the participation of a human user, such as a human system administrator. Although, in some implementations, a human system administrator may review the performance of the automated systems operating according to the automated processes described herein, that human involvement is optional. Thus, the processes described in the present application may be performed under the control of hardware processing components of the disclosed systems.

Moreover, as used in the present application, the feature "machine learning model" refers to a mathematical model for making future predictions based on patterns learned from samples of data obtained from a set of trusted predetermined matches and mismatches, known as training data. Various learning algorithms can be used to map correlations between input data and output data. These correlations form the mathematical model that can be used to make future predictions on new input data. Such a predictive model may include one or more logistic regression models, Bayesian models, or neural networks (NNs), for example. In addition, machine learning models may be designed to progressively improve their performance of a specific task.

An NN is a type of machine learning model in which patterns or learned representations of observed data are processed using highly connected computational layers that map the relationship between inputs and outputs. A "deep neural network" (deep NN), in the context of deep learning, may refer to an NN that utilizes multiple hidden layers between input and output layers, which may allow for learning based on features not explicitly defined in raw data. As used in the present application, a feature labeled as an NN refers to a deep NN. In various implementations, NNs may be utilized to perform image processing or natural-language processing.

FIG. 1 shows a diagram of an exemplary system for performing 3D skeleton mapping, according to one implementation. As shown in FIG. 1, system 100 can include computing platform 102 having processing hardware 104 and system memory 106 implemented as a computer-readable non-transitory storage medium. As shown in FIG. 1, system memory 106 of system 100 may store 3D pose, gesture, and location detection software code 110, as well as trained skeletal key-point detection machine learning model 148.

As further shown in FIG. 1, system 100 is implemented within a use environment including communication network 130 providing network communication links 132, venue 140, two or more cameras 142a, 142b, 142c (hereinafter "camera(s) 142a-142c") situated in venue 140 and generating two-dimensional (2D) image data 144a, 144b, and 144c, respectively, (hereinafter "2D image data 144a-144c") as inputs to system 100. Moreover, FIG. 1 shows one or more objects 108a and 108b, depicted as one or more human skeletons (hereinafter "skeleton(s) 108a/108b") in FIG. 1, which are present at venue 140 and may occlude one another from the perspective of one or more of camera(s) 142a-142c. Also shown in FIG. 1 are skeleton data 112a, 112b, 114a, 114b, 116a, and 116b.

It is noted that venue 140 may take the form of an outdoor or otherwise open air venue. Such venues may include a museum property, a theme park, a historical site, or a public space such as a city block, square, or park, to name a few examples. Alternatively, in some implementations, venue 140 may be an indoor venue, such as a museum, library, theater, concert hall, factory, school, healthcare facility, assisted living facility, for example.

Also shown in FIG. 1 is user system 134 having display 136 and utilized by user 138 to receive 3D pose or poses 128 (hereinafter "3D pose(s) 128") of skeleton(s) 108a/108b, generated by system 100 based on 2D image data 144a-144c. It is noted that, in some implementations, system 100, venue 140, and user system 134 may be remote from one another, and system 100 may be communicatively coupled to user system 134, and to camera(s) 142a-142c in venue 140 via communication network 130 and network communication links 132.

Camera(s) 142a-142c may be red-green-blue (RGB) still cameras, or video cameras, for example. Thus 2D image data 144a-144c may include digital photographs or sequences of video frames, for example. In addition, 2D image data 144a-144c may include camera metadata, such as the respective locations of cameras 142a-142c. More generally, however, camera(s) 142a-142c may take the form of any devices configured to capture spatial data. Moreover, although FIG. 1 depicts the use of three cameras, that representation is merely exemplary. In other implementations, camera(s) 142a-142c may include as few as two cameras, or more than three cameras, such as any integer number (N) greater than three. According to the exemplary implementation shown in FIG. 1, the event taking place in venue 140 and at which skeleton(s) 108a/108b are present may be a live event, such as an artistic, sports, or entertainment event, for example. In the exemplary implementation of FIG. 1, system 100 is configured to provide 3D pose(s) 128 in real-time with respect to the performance of such a live event.

Although the present application refers to 3D pose, gesture, and location detection software code 110 and trained skeletal key-point detection machine learning model 148 as being stored in system memory 106 for conceptual clarity, more generally system memory 106 may take the form of any computer-readable non-transitory storage medium. The expression "computer-readable non-transitory storage medium," as used in the present application, refers to any medium, excluding a carrier wave or other transitory signal that provides instructions to processing hardware 104 of computing platform 102. Thus, a computer-readable non-transitory storage medium may correspond to various types of media, such as volatile media and non-volatile media, for example. Volatile media may include dynamic system memory, such as dynamic random access system memory (dynamic RAM), while non-volatile system memory may include optical, magnetic, or electrostatic storage devices. Common forms of computer-readable non-transitory storage media include, for example, optical discs, RAM, programmable read-only system memory (PROM), erasable PROM (EPROM), and FLASH system memory.

Moreover, although FIG. 1 depicts 3D pose, gesture, and location detection software code 110 and trained skeletal key-point detection machine learning model 148 as being stored together in system memory 106, that representation is also provided merely as an aid to conceptual clarity. More generally, system 100 may include one or more computing platforms 102, such as computer servers for example, which may be co-located, or may form an interactively linked but distributed system, such as a cloud-based system, for instance. As a result, processing hardware 104 and system memory 106 may correspond to distributed processor and system memory resources within system 100.

Processing hardware 104 may include multiple hardware processing units, such as one or more central processing units, one or more GPUs, one or more tensor processing units, one or more field-programmable gate arrays (FPGAs), and an application programming interface (API) server, for example. By way of definition, as used in the present application, the terms "central processing unit" (CPU). "GPU." and "tensor processing unit" (TPU) have their customary meaning in the art. That is to say, a CPU includes an Arithmetic Logic Unit (ALU) for carrying out the arithmetic and logical operations of computing platform 102, as well as a Control Unit (CU) for retrieving programs, such as 3D pose, gesture, and location detection software code 110, from system memory 106, while a GPU may be implemented to reduce the processing overhead of the CPU by performing computationally intensive graphics or other processing tasks. A TPU is an application-specific integrated circuit (ASIC) configured specifically for artificial intelligence (AI) applications such as machine learning modeling.

According to the implementation shown by FIG. 1, user 138 may utilize user system 134 to interact with system 100 over communication network 130. In one such implementation, computing platform 102 may correspond to one or more web servers, accessible over a packet-switched network such as the Internet, for example. Alternatively, computing platform 102 may correspond to one or more computer servers supporting a local area network (LAN), a wide area network (WAN), or included in another type of limited distribution or private network.

User system 134 and communication network 130 enable user 138 to receive 3D pose(s) 128 of skeleton(s) 108a/108b in venue 140 from system 100. 3D pose(s) may be a collection of data that allows user 138 of user system 134 to more accurately perceive, recognize, and classify, for example, the 3D locations, postures, gestures, and body movements of skeleton(s) 108a/108b. Although user system 134 is shown as a desktop computer in FIG. 1, that representation is provided merely as an example. More generally, user system 134 may be any suitable mobile or stationary computing device or system that implements data processing capabilities sufficient to provide a user interface, support connections to communication network 130, and implement the functionality ascribed to user system 134 herein. For example, in some implementations, user system 134 may take the form of a laptop computer, tablet computer, or smartphone, for example. However, in other implementations user system 134 may be a "dumb terminal" peripheral component of system 100 that enables user 138 to provide inputs via a keyboard or other input device, as well as to view video content via display 136. In those implementations, user system 134 and display 136 may be controlled by processing hardware 104 of system 100.

With respect to display 136 of user system 134, display 136 may be physically integrated with user system 134 or may be communicatively coupled to but physically separate from user system 134. For example, where user system 134 is implemented as a smartphone, laptop computer, or tablet computer, display 136 will typically be integrated with user system 134. By contrast, where user system 134 is implemented as a desktop computer, display 136 may take the form of a monitor separate from user system 134 in the form of a computer tower. Moreover, display 136 may be implemented as a liquid crystal display (LCD), a light-emitting diode (LED) display, an organic light-emitting diode (OLED) display, a quantum dot (QD) display, or a display using any other suitable display technology that performs a physical transformation of signals to light.

Figure 2:
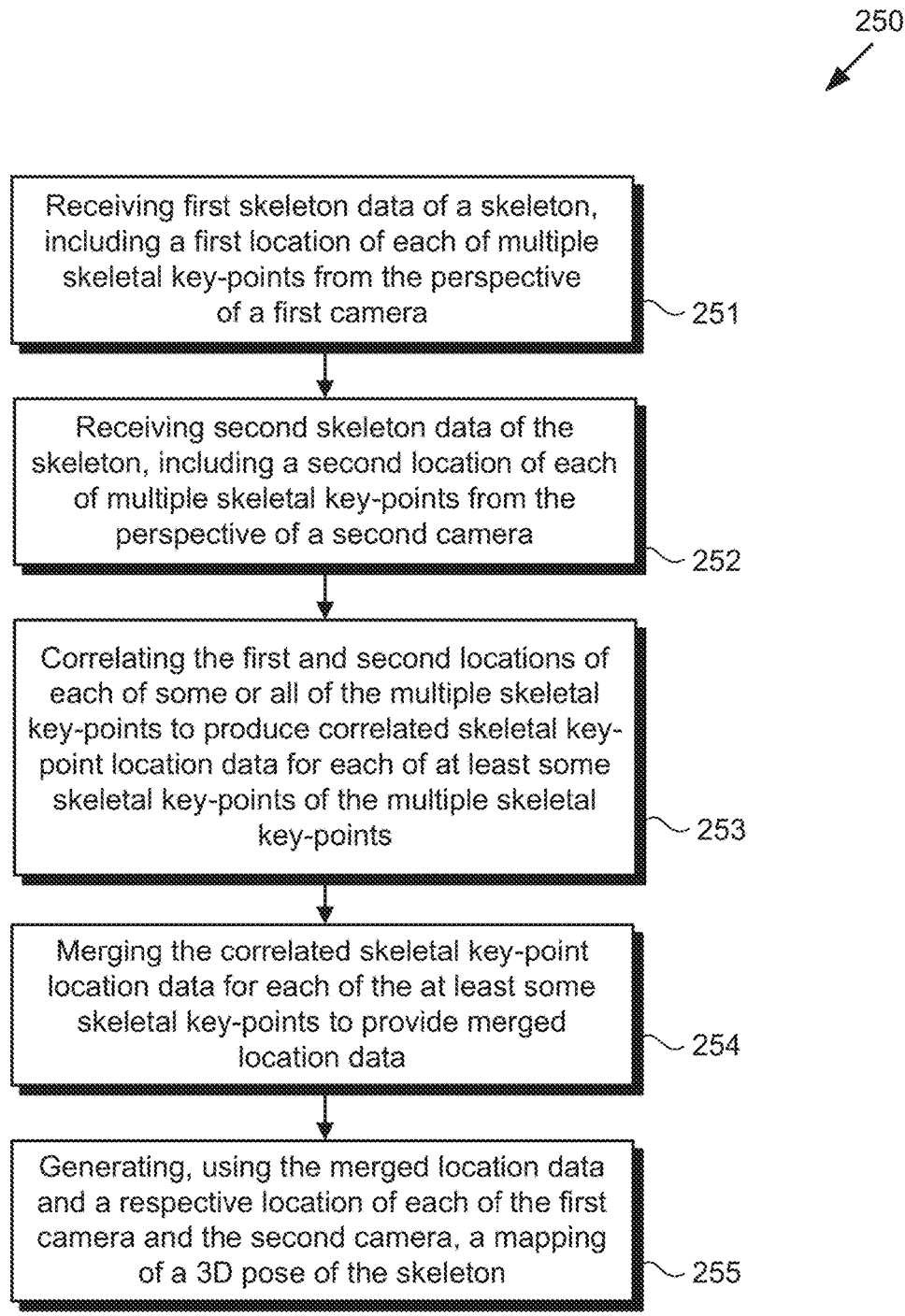
FIG. 2 shows a flowchart presenting an exemplary method for performing 3D skeleton mapping, according to one implementation.

The functionality of 3D pose, gesture, and location detection software code 110 will be further described by reference to FIG. 2 in combination with FIGS. 1 and 3. FIG. 2 shows flowchart 250 presenting an exemplary method for use by a system, such as system 100, in FIG. 1, for performing 3D skeleton mapping. With respect to the method outlined in FIG. 2, it is noted that certain details and features have been left out of flowchart 250 in order not to obscure the discussion of the inventive features in the present application.

Figure 3:
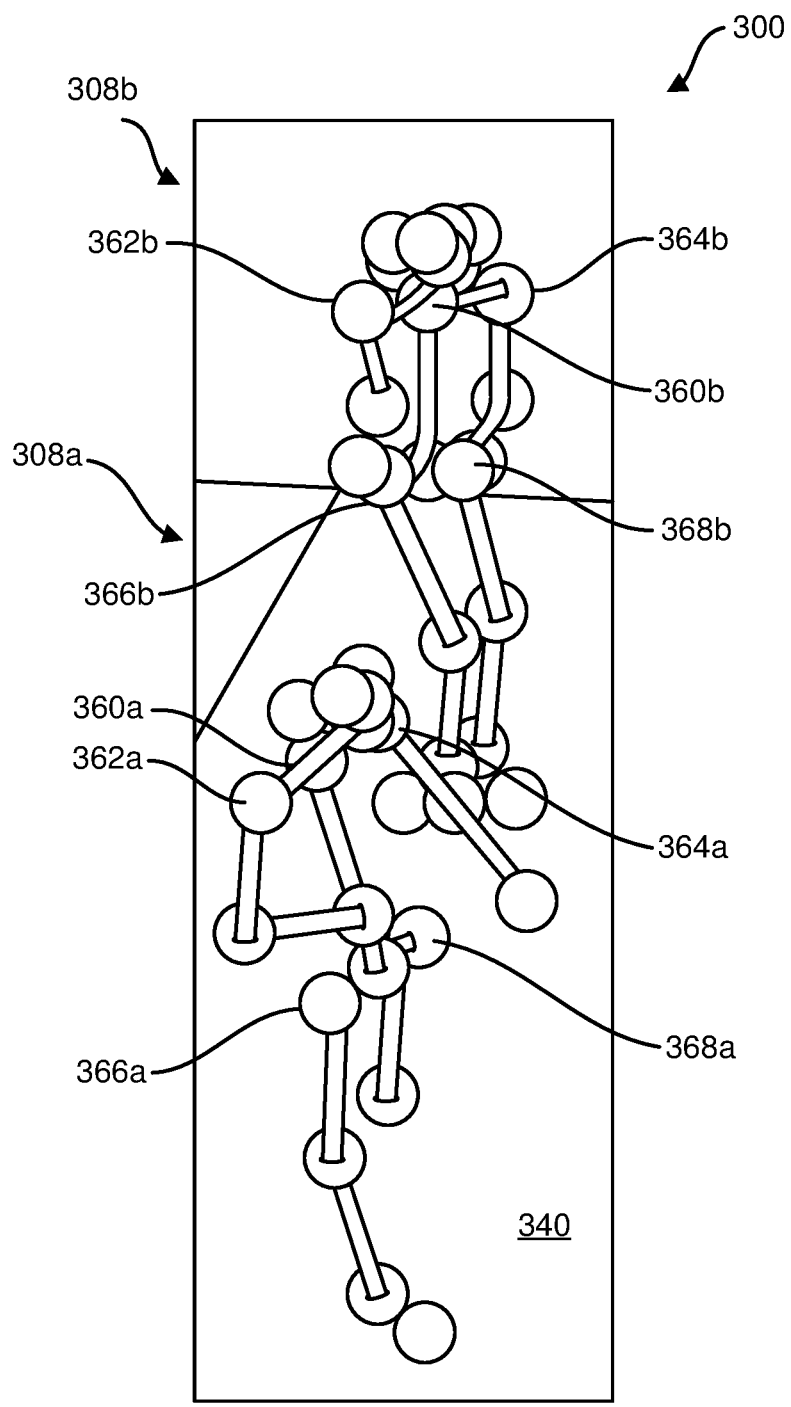
FIG. 3 shows an exemplary diagram of skeletal keypoints for use in performing 3D skeleton mapping, according to one implementation.

FIG. 3 shows diagram 300 of skeletal key-points for use in performing 3D skeleton mapping, according to one implementation. As shown in FIG. 3, one or more skeletons 308a and 308b (hereinafter "skeleton(s) 308a/308b") are present at venue 340. As further shown in FIG. 3, each of skeletons 308a and 308b may be characterized by multiple skeletal key-points. For example, skeleton 308a may be characterized by one or more of skeletal key-point 360a situated at the neck of skeleton 308a, skeletal key-points 362a and 364a situated at the respective right and left shoulder joints of skeleton 308a, and skeletal key-points 366a and 368a situated at the respective right and left hip joints of skeleton 308a. Similarly, skeleton 308b may be characterized by one or more of skeletal key-point 360b situated at the neck of skeleton 308b, skeletal key-points 362b and 364b situated at the respective right and left shoulder joints of skeleton 308b, and skeletal key-points 366b and 368b situated at the respective right and left hip joints of skeleton 308b.

In addition to, or as alternatives to, skeletal key-points 360a. 362a, 364a. 366a, and 368a (hereinafter "skeletal key-points 360a-368a") and skeletal key-points 360b, 362b. 364b, 366b, and 368b (hereinafter "skeletal key-points 360b-368b") described above, other skeletal key-points of skeleton(s) 308a/308b suitable for use in performing 3D mapping of skeleton(s) 308a/308b may include one or more of the eyes, ears, nose, elbows, wrists, mid-pelvis, knees, ankles, heels, big toes, and little ("pinky") toes of skeleton(s) 308a/308b.

It is noted that venue 340 and skeleton(s) 308a/308b correspond respectively in general to venue 140 and skeleton(s) 108a/108b, in FIG. 1. Consequently, venue 340 and skeleton(s) 308a/308b may share any of the characteristics attributed to respective venue 140 and skeleton(s) 108a/108b by the present disclosure, and vice versa.

Referring now to FIG. 2 in combination with FIGS. 1 and 3, flowchart 250 begins with receiving first skeleton data (hereinafter "skeleton data 112a") of a skeleton, (hereinafter "skeleton 108a/308a"), where skeleton data 112a includes a first location of each of multiple skeletal key-points, (hereinafter "skeletal key-points 360a-368a"), from the perspective of a first camera, (hereinafter "camera 142a") (action 251). Skeleton data 112a may be received in action 251 by 3D pose, gesture, and location detection software code 110, executed by processing hardware 104 of system 100. In some implementations, skeleton data 112a may be included in a first 2D image data (hereinafter "2D image data 144a") provided by camera 142a. In those implementations, skeleton data 112a may be received by system 100 via communication network 130 and network communication links 132.

However, in other implementations, as shown in FIG. 1, skeleton data 112a may be received by 3D pose, gesture, and location detection software code 110 from trained skeletal key-point detection machine learning model 148. In those implementations, processing hardware 102 may execute trained skeletal key-point detection machine learning model 148 to obtain, from camera 142a, 2D image data 144a, and to infer, using 2D image data 144a, the first location of each of skeletal key-points 360a-368a from the perspective of camera 142a to provide skeleton data 112a as an output to 3D pose, gesture, and location detection software code 110. As noted above, in some implementations, skeletal key-points 360a-368a may include one or more of skeletal key-point 360a situated at the neck of skeleton 108a/308a, skeletal key-points 362a and 364a situated at the respective right and left shoulder joints of skeleton 108a/308a, and skeletal key-points 366a and 368a situated at the respective right and left hip joints of skeleton 108a/308a.

Flowchart 250 may continue with receiving second skeleton data (hereinafter "skeleton data 114a") of skeleton 108a/308a, skeleton data 114a including a second location of each of skeletal key-points 360a-368a, from the perspective of a second camera (hereinafter "camera 142b") (action 252). As is the case for action 251, skeleton data 114a may be received in action 252 by 3D pose, gesture, and location detection software code 110, executed by processing hardware 104 of system 100. In some implementations, skeleton data 114a may be included in a second 2D image data (hereinafter "2D image data 144b") provided by camera 142b. In those implementations, skeleton data 114a may be received by system 100 via communication network 130 and network communication links 132.

However, in other implementations, as shown in FIG. 1, skeleton data 114a may be received by 3D pose, gesture, and location detection software code 110 from trained skeletal key-point detection machine learning model 148. In those implementations, processing hardware 102 may execute trained skeletal key-point detection machine learning model 148 to obtain, from camera 142b, 2D image data 144b, and to infer, using 2D image data 144b, the second location of each of skeletal key-points 360a-368a from the perspective of camera 142b to provide skeleton data 114a as an output to 3D pose, gesture, and location detection software code 110.

Although not shown in FIG. 2, in some implementations, the method outlined by flowchart 250 may further include receiving any integer number "N" of skeleton data each including a respective one of N locations of each of skeletal key-points 360a-368a, from the perspective of N different cameras. For example, in some implementations, the method outlined by flowchart 250 may include receiving third skeleton data (hereinafter "skeleton data 116a") of skeleton 108a/308a, skeleton data 116a including a third location of each of skeletal key-points 360a-368a, from the perspective of a third camera (hereinafter "camera 142c), and so forth.

With respect to actions 251 and 252 described above, it is noted that although flowchart 250 shows action 251 as preceding action 252, that representation is merely by way of example. In some implementations, actions 251 and 252 may be performed in parallel, i.e., substantially concurrently. Moreover, in use cases in which N skeleton data are received by 3D pose, gesture, and location detection software code 110, those N skeleton data may be received in parallel.

Flowchart 250 also includes correlating, for each of some or all of skeletal key-points 360a-368a, the first location of each of those skeletal key-points from the perspective of camera 142a with the second location of each of those skeletal key-points from the perspective of camera 142b to produce correlated skeletal key-point location data for each of at least some skeletal key-points of skeletal key-points 360a-368a (action 253). Action 253 may be performed by 3D pose, gesture, and location detection software code 110, executed by processing hardware 104 of system 100.

In some implementations, producing the correlated skeletal key-point location data for each of some or all of skeletal key-points 360a-368a may include imposing an epipolar constraint on skeleton data 112a and 114a of skeleton 108a/308a. For example, the epipolar constraint that a point detected by camera 142a must lay on a particular line from the perspective of camera 142b, and vice versa, enables determination of the location of points in 3D space using triangulation. Such an epipolar constraint may be described by the essential matrix (or fundamental matrix) between cameras 142a and 142b.

In implementations in which skeleton data 116a is also received by 3D pose, gesture, and location detection software code 110, action 253 may include correlating the first location of each of some or all of skeletal key-points 360a-368a from the perspective of camera 142a, the second location of each of those same skeletal key-points from the perspective of camera 142b, and the third location of each of those same skeletal key-points from the perspective of camera 142c to produce the correlated skeletal key-point location data for each of those skeletal key-points. In those implementations, producing the correlated skeletal key-point location data for each of some or all of skeletal key-points 360a-368a may include imposing epipolar constraints on skeleton data 112a. 114a, and 116a of skeleton 108a/308a, as described above, to provide pair-wise matched first skeletal key-point 2D locations. Moreover, when N instances of 2D image data are provided to system 100 from N different camera perspectives, such pair-wise matching may be performed for all N locations of some or all of skeletal key-points 360a-368a.

It is noted that the correlated skeletal key-point location data for each of some or all of skeletal key-points 360a-368a may include a confidence score for each correlation. Completion of action 253 may thus result in a list of scored correlations or matches. Based on the confidence score associated with each correlation, plausible correlations may be retained and implausible correlations may be rejected, based on a predetermined confidence score threshold, for example. That is to say correlations having confidence scores satisfying a predetermined scoring criterion may be retained as plausible correlations, while those having confidence scores failing to satisfy the predetermined scoring criterion may be rejected.

In some implementations, the confidence scores associated with the correlations based on 2D image data received from a particular camera may be used to detect malfunction or misalignment of that camera. For example, a global score for each of cameras 144a-144c, such as the median or mean confidence scores associated with correlations based on respective 2D image data 144a-144c may be compared to determine whether one or more of cameras 142a-142c is/are underperforming relative to others of cameras 142a-142c.

It is further noted that in some implementations in which skeleton data 116a is also received by 3D pose, gesture, and location detection software code 110, action 253 may further include applying a tri-focal tensor matrix to at least some of the pair-wise matched skeletal key-point 2D locations to determine the triplet tri-focal error for each plausible correlation. Furthermore, when N instances of 2D image data are provided to system 100 from N different camera perspectives, an N-focal tensor matrix may be applied to some or all of the pair-wise matched skeletal key-point 2D locations as part of action 253. Completion of action 253 may result in a list of scored correlations or matches.

It is noted that, in some implementations, action 253 may be performed on a per-skeleton basis, rather than per-joint basis. That is to say, in some implementations, all of skeletal key-points 360a-368a of skeleton 108a/308a may be correlated to take advantage of the fact that all of the skeletal key-points from one camera perspective of a skeleton need to satisfy the constraints for all of the skeletal key-points from another camera perspective. This advantageously utilizes the isomorphic nature of skeleton graphs to further constrain matching or correlation.

Flowchart 250 also includes merging the correlated skeletal key-point location data for each of some or all of skeletal key-points 360a-368a to provide merged location data (action 254). As noted above, action 253 may result in a list of scored correlations. In action 254, the objective is to solve the graph partitioning problem by linking those scored correlations using a minimal set of linkages among them. In some implementations, action 254 may be performed using a greedy heuristic or greedy algorithm, as known in the art. Merging the correlated skeletal key-point location data for each of some skeletal key-points to provide the merged location data in action 254 may be performed by 3D pose, gesture, and location detection software code 110, executed by processing hardware 104 of system 100. Flowchart 250 also includes generating, using the merged location data provided in action 254 and the respective locations of camera 142a and camera 142b, a mapping or mappings of 3D pose(s) 128 of skeleton 108a/308a (action 255). Generation of the mapping or mappings of 3D pose(s) 128 of skeleton 108a/308a in action 255 may include triangulating the merged location data provided in action 254, for example. Action 255 may be performed by 3D pose, gesture, and location detection software code 110, executed by processing hardware 104 of system 100.

In implementations in which skeleton data 116a is also received by 3D pose, gesture, and location detection software code 110, generation of mapping or mappings of 3D pose(s) 128 of skeleton 108a/308a in action 255 may be performed using the location of camera 142c, as well as the merged location data provided in action 254 and the respective locations of camera 142a and camera 142b. Moreover, when N cameras having N different camera perspectives are present at venue 140, the merged location data provided in action 254 and the respective locations of all N cameras may be used to generate the mapping or mappings of 3D pose(s) 128 of skeleton 108a/308a in action 255.

It is noted that, in some implementations, actions 253 and 254 may be performed using visual features included in 2D image data 144a-114c other than skeleton data 112a, 114a, and 114b. For example, in various implementations, 3D pose, gesture, and location detection software code 110, when executed by processing hardware 104 of system 100, may be configured to perform one or more of object comparison or facial comparison on 2D image data 144a-144c, or to use color matching or feature matching as an aid to one or both of actions 253 and 254. However, it is noted that one significant advantage of the 3D skeleton mapping solution disclosed in the present application is that the mapping or mappings of 3D pose(s) 128 of skeleton 108a/308a can be generated without determining any PII of the person to whom the skeleton belongs. That is to say, the mapping or mappings of 3D pose(s) 128 of skeleton 108a/308a can be generated in action 256 without information describing the age, gender, race, ethnicity, or any other PII of any person being identified or inferred.

In some implementations actions 251 through 255 may be also be performed for another skeleton (hereinafter "skeleton 108b/308b") using skeleton data 112b and 114b, or using skeleton data 112b. 114b, and 116b. In addition, in those implementations, performance of actions 251 through 255 for skeleton 108b/308b may occur in parallel with the performance of actions 251 through 255 for skeleton 108a/308a. In implementations in which actions 251 through 255 are performed for skeleton 108b/308b as well as for skeleton 108a/308a, 3D pose(s) 128 may include the mapping of the 3D pose of skeleton 108b/308b in addition to the mapping of the 3D pose of skeleton 108a/308a. Moreover, the respective mappings of the 3D pose of each of skeletons 108a/308a and 108b/308b may be generated in action 255 substantially concurrently.

In some implementations, actions 251 through 255 may be repeated for one or both of skeletons 108a/308a and 108b/308b to generate a temporal sequence of mappings of 3D pose(s) 128. In those implementations, it may be advantageous or desirable to use a particular mapping of the temporal sequence as a correlation proposal or template for the next consecutive mapping of the temporal sequence of mappings to reduce computational overhead.

In some use cases, due to noise in 2D image data 144a-144c for example, the same skeleton may result in different mappings of a similar 3D pose. Thus, in some implementations it may be advantageous or desirable to compare mappings of 3D poses of ostensibly distinct skeletons to determine whether they satisfy a similarity criterion or criteria. For example, skeletons 108a/308a and 108b/308b may satisfy a similarity criterion and may be deemed to be the same skeleton if skeletal key-points 360a-368a are mapped to locations within a predetermined distance of respective skeletal key-points 360b, 362b. 364b. 366b, and 368b (hereinafter "skeletal key-points 360b-368b). In those use cases, processing hardware 104 of system 100 may further execute 3D pose, gesture, and location detection software code 110 to merge the mapping of 3D pose of skeleton 108a/308a with the mapping of the 3D pose of skeleton 108b/308b to provide a merged skeleton having merged skeletal key-points, and to generate, using the merged skeletal key-points, a mapping of 3D pose 128 of the merged skeleton With respect to the method outlined by flowchart 250 and described above, it is emphasized that, in some implementations, actions 251 through 255, as well as iterations of those actions, may be performed in an automated process from which human involvement may be omitted.

Thus, the present application discloses a 3D skeleton mapping solution that addresses and overcomes the deficiencies in the conventional art. By contrast to conventional approaches, the solution disclosed in the present application advantageously relies only on geometric constraints, and consequently does not require expensive neural processing to compute visual features. As a result, the 3D skeleton mapping solution disclosed herein may be implemented without detecting or determining any PII of the person to whom a skeleton belongs. In addition, in one implementation, the present solution can be formulated as a series of matrix multiplications, thereby enabling substantially all mapping combinations to be tested in a single pass using GPU hardware, for example. Furthermore. and as noted above, the present 3D skeleton mapping solution can advantageously be implemented as substantially automated systems and methods.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A three-dimensional (3D) skeleton mapping system comprising:
   a computing platform having processing hardware and a system memory storing a software code;
   the processing hardware configured to execute the software code to:
   receive first skeleton data of a skeleton, the first skeleton data including a first location of each of a plurality of skeletal key-points from a perspective of a first camera;
   receive second skeleton data of the skeleton, the second skeleton data including a second location of each of the plurality of skeletal key-points from a perspective of a second camera;
   correlate, for the plurality of skeletal key-points, the first location of each of the plurality of skeletal key-points from the perspective of the first camera with the second location of each of the plurality of skeletal key-points from the perspective of the second camera to produce a correlated skeletal key-point location data for each of the plurality of skeletal key-points;
   merge the correlated skeletal key-point location data for each of the plurality of skeletal key-points to provide a merged location data; and
   generate, using the merged location data and a respective location of each of the first camera and the second camera, a mapping of a 3D pose of the skeleton.

2. The 3D skeleton mapping system of claim 1, wherein the processing hardware is further configured to execute the software code to:
   receive first skeleton data of another skeleton, the first skeleton data of the another skeleton including a first location of each of a plurality of skeletal key-points of the another skeleton from the perspective of the first camera;

receive second skeleton data of the another skeleton, the second skeleton data of the another skeleton including a second location of each of the plurality of skeletal key-points of the another skeleton from the perspective of the second camera;

correlate, for at least some skeletal key-points of the plurality of skeletal key-points of the another skeleton, the first location of each of the at least some skeletal key-points of the another skeleton from the perspective of the first camera with the second location of each of the at least some skeletal key-points of the another skeleton from the perspective of the second camera to produce correlated skeletal key-point location data for each of the at least some skeletal key-points of the another skeleton;

merge the correlated skeletal key-point location data for each of the at least some skeletal key-points of the another skeleton to provide another merged location data; and generate, using the another merged location data and the respective location of each of the first camera and the second camera, a mapping of a 3D pose of the another skeleton.

3. The 3D skeleton mapping system of claim 2, wherein when the mapping of the 3D pose of the skeleton and the mapping of the 3D pose of the another skeleton satisfy a similarity criterion, the processing hardware is further configured to execute the software code to:

merge the mapping of the 3D pose of the skeleton with the mapping of the 3D pose of the another skeleton to provide a merged skeleton having a plurality of merged skeletal key-points; and generate, using the plurality of merged skeletal key-points, a mapping of a 3D pose of the merged skeleton.

4. The 3D skeleton mapping system of claim 1, wherein producing the correlated skeletal key-point location data for each of the plurality of skeletal key-points comprises imposing an epipolar constraint on the first and second skeleton data of the skeleton.

5. The 3D skeleton mapping system of claim 1, wherein the system further comprises a trained machine learning model stored in the system memory, and wherein the processing hardware is configured to execute the trained machine learning model to:

obtain, from the first camera, a first two-dimensional (2D) image data;

infer, using the first 2D image data, the first location of each of the plurality of skeletal key-points from the perspective of the first camera to provide the first skeleton data;

obtain, from the second camera, a second 2D image data;

infer, using the second 2D image data, the second location of each of the plurality of skeletal key-points from the perspective of the second camera to provide the second skeleton data; and output the first skeleton data and the second skeleton data to the software code.

6. The 3D skeleton mapping system of claim 1, wherein the mapping of the 3D pose of the skeleton is generated without determining any personally identifiable information (PII) of a person comprising the skeleton.

7. A method for use by a 3D skeleton mapping system including a computing platform having a processing hardware and a system memory storing a software code, the method comprising:

receiving, by the software code executed by the processing hardware, first skeleton data of a skeleton, the first skeleton data including a first location of each of a plurality of skeletal key-points from a perspective of a first camera;

receiving, by the software code executed by the processing hardware, second skeleton data of the skeleton, the second skeleton data including a second location of each of the plurality of skeletal key-points from a perspective of a second camera;

correlating, by the software code executed by the processing hardware, the plurality of skeletal key-points, the first location of each of the plurality of skeletal key-points from the perspective of the first camera with the second location of each of the plurality of skeletal key-points from the perspective of the second camera to produce a correlated skeletal key-point location data for each of the plurality of skeletal key-points;

merging, by the software code executed by the processing hardware, the correlated skeletal key-point location data for each of the plurality of skeletal key-points to provide a merged location data; and generating, by the software code executed by the processing hardware and using the merged location data and a respective location of each of the first camera and the second camera, a mapping of a 3D pose of the skeleton.

8. The method of claim 7, further comprising:

receiving, by the software code executed by the processing hardware, first skeleton data of another skeleton, the first skeleton data of the another skeleton including a first location of each of a plurality of skeletal key-points of the another skeleton from the perspective of the first camera;

receiving, by the software code executed by the processing hardware, second skeleton data of the another skeleton, the second skeleton data of the another skeleton including a second location of each of the plurality of skeletal key-points of the another skeleton from the perspective of the second camera;

correlating, by the software code executed by the processing hardware for at least some skeletal key-points of the plurality of skeletal key-points of the another skeleton, the first location of the at least some skeletal key-points of the another skeleton from the perspective of the first camera with the second location of the at least some skeletal key-points of the another skeleton from the perspective of the second camera to produce a correlated skeletal key-point location data for each of the at least some skeletal key-points of the another skeleton;

merging, by the software code executed by the processing hardware, the correlated skeletal key-point location data for each of the at least some skeletal key-points of the another skeleton to provide another merged location data; and generating, by the software code executed by the processing hardware and using the another merged location data and the respective location of each of the first camera and the second camera, a mapping of a 3D pose of the another skeleton.

9. The method of claim 8, wherein when the mapping of the 3D pose of the skeleton and the mapping of the 3D pose of the another skeleton satisfy a similarity criterion, the method further comprises:

merging, by the software code executed by the processing hardware, the 3D pose of the skeleton with the mapping of the 3D pose of the another skeleton to provide a merged skeleton having a plurality of merged skeletal key-points; and generating, by the software code executed by the processing hardware and using the plurality of merged skeletal key-points, a mapping of a 3D pose of the merged skeleton.

10. The method of claim 7, wherein producing the correlated skeletal key-point location data for each of the plurality of skeletal key-points comprises imposing an epipolar constraint on the first and second skeleton data of the skeleton.

11. The method of claim 7, wherein the system further comprises a trained machine learning model stored in the system memory, the method further comprising:
obtaining, by the trained machine learning model executed by the processing hardware, from the first camera, a first two-dimensional (2D) image data;
inferring, by the trained machine learning model executed by the processing hardware and using the first 2D image data, the first location of each of the plurality of skeletal key-points from the perspective of the first camera to provide the first skeleton data;
obtaining, by the trained machine learning model executed by the processing hardware, from the second camera, a second 2D image data;
inferring, by the trained machine learning model executed by the processing hardware and using the second 2D image data, the second location of each of the plurality of skeletal key-points from the perspective of the second camera to provide the second skeleton data; and
outputting, by the trained machine learning model executed by the processing hardware, the first skeleton data and the second skeleton data to the software code.

12. A three-dimensional (3D) skeleton mapping system comprising:
a computing platform having processing hardware and a system memory storing a software code;
the processing hardware configured to execute the software code to:
receive first skeleton data of a skeleton, the first skeleton data including a first location of each of a plurality of skeletal key-points from a perspective of a first camera;
receive second skeleton data of the skeleton, the second skeleton data including a second location of each of the plurality of skeletal key-points from a perspective of a second camera;
receive third skeleton data of the skeleton, the third skeleton data including a third location of each of the plurality of skeletal key-points from a perspective of a third camera;
correlate, for at least some skeletal key-points of the plurality of skeletal key-points, the first location of each of the at least some skeletal key-points from the perspective of the first camera with the second location of each of the at least some skeletal key-points from the perspective of the second camera and the third location of each of the at least some skeletal key-points from the perspective of the third camera to produce a correlated skeletal key-point location data for each of the at least some skeletal key-points;
merge the correlated skeletal key-point location data for each of the at least some skeletal key-points to provide a merged location data; and
generate, using the merged location data and a respective location of each of the first camera, the second camera, and the third camera, a mapping of a 3D pose of the skeleton.

13. The 3D skeleton mapping system of claim 12, wherein the at least some skeletal key-points of the plurality of skeletal key-points comprise all of the plurality of skeletal key-points.

14. The 3D skeleton mapping system of claim 12, wherein the processing hardware is further configured to execute the software code to:
receive first skeleton data of another skeleton, the first skeleton data of the another skeleton including a first location of each of a plurality of skeletal key-points of the another skeleton from the perspective of the first camera;
receive second skeleton data of the another skeleton, the second skeleton data of the another skeleton including a second location of each of the plurality of skeletal key-points of the another skeleton from the perspective of the second camera;
receive third skeleton data of the another skeleton, the third skeleton data of the another skeleton including a third location of each of the plurality of skeletal key-points of the another skeleton from the perspective of the third camera;
correlate, for at least some skeletal key-points of the plurality of skeletal key-points of the another skeleton, the first location of each of the at least some skeletal key-points of the another skeleton from the perspective of the first camera with the second location of each of the at least some skeletal key-points of the another skeleton from the perspective of the second camera and the third location of each of the at least some skeletal key-points of the another skeleton from the perspective of the third camera to produce a correlated skeletal key-point location data of each of the at least some skeletal key-points of the another skeleton;
merge the correlated skeletal key-point location data for each of the at least some skeletal key-points to provide another merged location data; and
generate, using the another merged location data and the respective location of each of the first camera, the second camera, and the third camera a mapping of a 3D pose of the another skeleton.

15. The 3D skeleton mapping system of claim 14, wherein when the mapping of the 3D pose of the skeleton and the mapping of the 3D pose of the another skeleton satisfy a similarity criterion, the processing hardware is further configured to execute the software code to:
merge the mapping of the 3D pose of the skeleton with the mapping of the 3D pose of the another skeleton to provide a merged skeleton having a plurality of merged skeletal key-points; and
generate, using the plurality of merged skeletal key-points, a mapping of a 3D pose of the merged skeleton.

16. The 3D skeleton mapping system of claim 12, wherein producing the correlated skeletal key-point location data for each of the at least some skeletal key-points comprises imposing an epipolar constraint on the first, second, and third skeleton data of the skeleton to provide a plurality of pair-wise matched skeletal key-point 2D locations.

17. The 3D skeleton mapping system of claim 16, wherein producing the correlated skeletal key-point 2D location data for each of the at least some skeletal key-points, further comprises applying a tri-focal tensor matrix to the plurality of pair-wise matched skeletal key-point 2D locations.

18. The 3D skeleton mapping system of claim 12, wherein the mapping of the 3D pose of the skeleton is generated without determining any personally identifiable information (PII) of a person comprising the skeleton.

19. A three-dimensional (3D) skeleton mapping system comprising:
- a computing platform having processing hardware and a system memory storing a software code;
- the processing hardware configured to execute the software code to:
  - receive first skeleton data of a skeleton, the first skeleton data including a first location of each of a plurality of skeletal key-points from a perspective of a first camera;
  - receive second skeleton data of the skeleton, the second skeleton data including a second location of each of the plurality of skeletal key-points from a perspective of a second camera;
  - correlate, for at least some skeletal key-points of the plurality of skeletal key-points, the first location of each of the at least some skeletal key-points from the perspective of the first camera with the second location of each of the at least some skeletal key-points from the perspective of the second camera to produce a correlated skeletal key-point location data for each of the at least some skeletal key-points;
  - merge the correlated skeletal key-point location data for each of the at least some skeletal key-points to provide a merged location data; and
  - generate, using the merged location data and a respective location of each of the first camera and the second camera, a mapping of a 3D pose of the skeleton without determining any personally identifiable information (PII) of a person comprising the skeleton.

20. The 3D skeleton mapping system of claim 19, wherein producing the correlated skeletal key-point location data for each of the at least some skeletal key-points comprises imposing an epipolar constraint on the first and second skeleton data of the skeleton.

* * * * *